(12) United States Patent
Nauert

(10) Patent No.: US 9,221,502 B2
(45) Date of Patent: Dec. 29, 2015

(54) AERODYNAMIC GOOSENECK TRAILER

(76) Inventor: Richard S. Nauert, Corona Del Mar, CA (US)

( * ) Notice: Subject to any disclaimer, the term of this patent is extended or adjusted under 35 U.S.C. 154(b) by 0 days.

(21) Appl. No.: 13/445,819

(22) Filed: Apr. 12, 2012

(65) Prior Publication Data

US 2012/0261947 A1 Oct. 18, 2012

Related U.S. Application Data

(60) Provisional application No. 61/474,720, filed on Apr. 12, 2011.

(51) Int. Cl.
*B62D 33/04* (2006.01)
*B62D 35/00* (2006.01)
*B62D 53/06* (2006.01)
*B62D 37/02* (2006.01)

(52) U.S. Cl.
CPC .............. *B62D 35/001* (2013.01); *B62D 33/04* (2013.01); *B62D 53/061* (2013.01); *B62D 37/02* (2013.01)

(58) Field of Classification Search
CPC ...... B62D 35/001; B62D 37/02; B62D 33/04; B62D 53/061
USPC ............................ 296/180.1, 180.4, 61, 181.5
See application file for complete search history.

(56) References Cited

U.S. PATENT DOCUMENTS

| 5,180,205 | A | * | 1/1993 | Shoop ......................... 296/180.2 |
| 5,690,378 | A | * | 11/1997 | Romesburg ................. 296/181.3 |
| 6,634,700 | B1 | * | 10/2003 | Calvert ....................... 296/180.4 |
| 7,000,978 | B1 | * | 2/2006 | Messano .................... 296/181.6 |
| 7,240,958 | B2 | | 7/2007 | Skopic |
| 7,832,792 | B2 | * | 11/2010 | Fillion et al. .................. 296/178 |
| 8,113,570 | B1 | * | 2/2012 | Smith ......................... 296/180.4 |
| 2009/0108614 | A1 | * | 4/2009 | Washington .................... 296/61 |
| 2010/0230999 | A1 | * | 9/2010 | Setzer ........................... 296/173 |

* cited by examiner

*Primary Examiner* — Joseph D Pape
*Assistant Examiner* — Dana Ivey
(74) *Attorney, Agent, or Firm* — Fulwider Patton LLP

(57) ABSTRACT

An aerodynamic gooseneck trailer includes a leading end configuration that provides an aerodynamically efficient shape, and a main body portion including substantially vertically oriented sidewalls that are curved, and a roof section that is narrower than the floor section.

17 Claims, 6 Drawing Sheets

AERODYNAMIC GOOSENECK TRAILER

CROSS-REFERENCES TO RELATED APPLICATIONS

This application is based upon and claims priority from U.S. Provisional Application No. 61/474,720, filed Apr. 12, 2011, incorporated by reference herein.

BACKGROUND OF THE INVENTION

The present invention generally relates to reduction of airflow resistance and drag on trailers, and more particularly relates to an aerodynamic construction of gooseneck trailers.

Conventional trailers typically have been designed to be economical to build, and efficient for carrying cargo. The most economically shaped trailer configuration to produce is a rectilinear or flat sided box configuration, allowing building materials to be mass produced and assembled economically. This conventional design provides a carrying capacity suited for most cargo that is maximized by the vertical sidewalls and horizontal planes of the floor and ceiling panels of such trailers. However, such a convention design produces a significant amount of airflow resistance and drag on trailers, significantly affecting fuel efficiency of vehicles towing such trailers. As fuel prices have risen, fuel efficiency also has become a significant factor in the economics of trailer design considerations, such that fuel efficiency considerations and reduction of air flow resistance and drag on trailers can outweigh the original considerations of efficient construction and cubic capacity.

Conventional trailer homes with rounded corners are known that typically provide minimal streamlining and minimal reduction of air flow resistance and drag, and the use of vanes attached typically to the leading end of vehicles having a generally planar rear surface to redirect air flowing along the sides of the vehicle into a volume of low pressure air behind the rear surface for reducing drag are also known. However, so-called gooseneck or "fifth wheel" trailers typically having a gooseneck connection from the main body or frame of a trailer to a portion of a towing vehicle also typically have leading end configurations and vertical sidewalls presenting rectilinear corners that can significantly increase air flow resistance and drag on trailers.

It would be desirable to provide a gooseneck trailer configuration that includes a specially designed anterior or leading end body shape, starting at the front tip of the vehicle, that is formed primarily from convex contours, and splines or continuous curves, to provide an aerodynamically efficient shape. It would also be desirable to provide a gooseneck trailer configuration that includes substantially vertically oriented sidewalls that are curved from top to the bottom, with the top corners of the vertically oriented sidewalls being more closely spaced apart than bottom corners of the sidewalls, narrower than the bottom corners of the vertically oriented sidewalls, with the roof section being narrower than the floor section. It would also be desirable to provide a rear surface having an aerodynamic shape to help reduce energy lost to aerodynamic drag. The present invention meets these and other needs.

SUMMARY OF THE INVENTION

Briefly and in general terms, the present invention provides for a gooseneck trailer configuration having a leading end configuration that provides an aerodynamically efficient shape, and a main body portion including substantially vertically oriented sidewalls that are curved, and a roof section that is narrower than the floor section.

The present invention accordingly provides for an improved aerodynamic gooseneck trailer including a trailer body having a leading end including a front connector configured to be connected to a towing vehicle, a trailing end, a roof section and a floor section, and substantially vertically oriented sidewalls connected between the roof section and floor section. In a presently preferred aspect, the leading end is connected to the roof section, the floor section, and the substantially vertically oriented sidewalls by a tapered anterior body portion extending from the front connector rearwardly to the roof section, the floor section, and the substantially vertically oriented sidewalls, the tapered anterior body portion are formed substantially of convex contours, and splines or continuous curves. In another presently preferred aspect, the substantially vertically oriented sidewalls are curved from the roof section to the floor section. In another presently preferred aspect, the roof section and the vertically oriented sidewalls form top corners that are spaced apart a first distance, the floor section and the vertically oriented sidewalls form bottom corners that are spaced apart a second distance, and the first distance is smaller than the second distance, such that the roof section is narrower than the floor section. In another presently preferred aspect, rear surface may have an aerodynamic shape, such as a rounded, convex, teardrop, or "spoiler/flap" configuration, in order to help reduce energy lost to aerodynamic drag.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
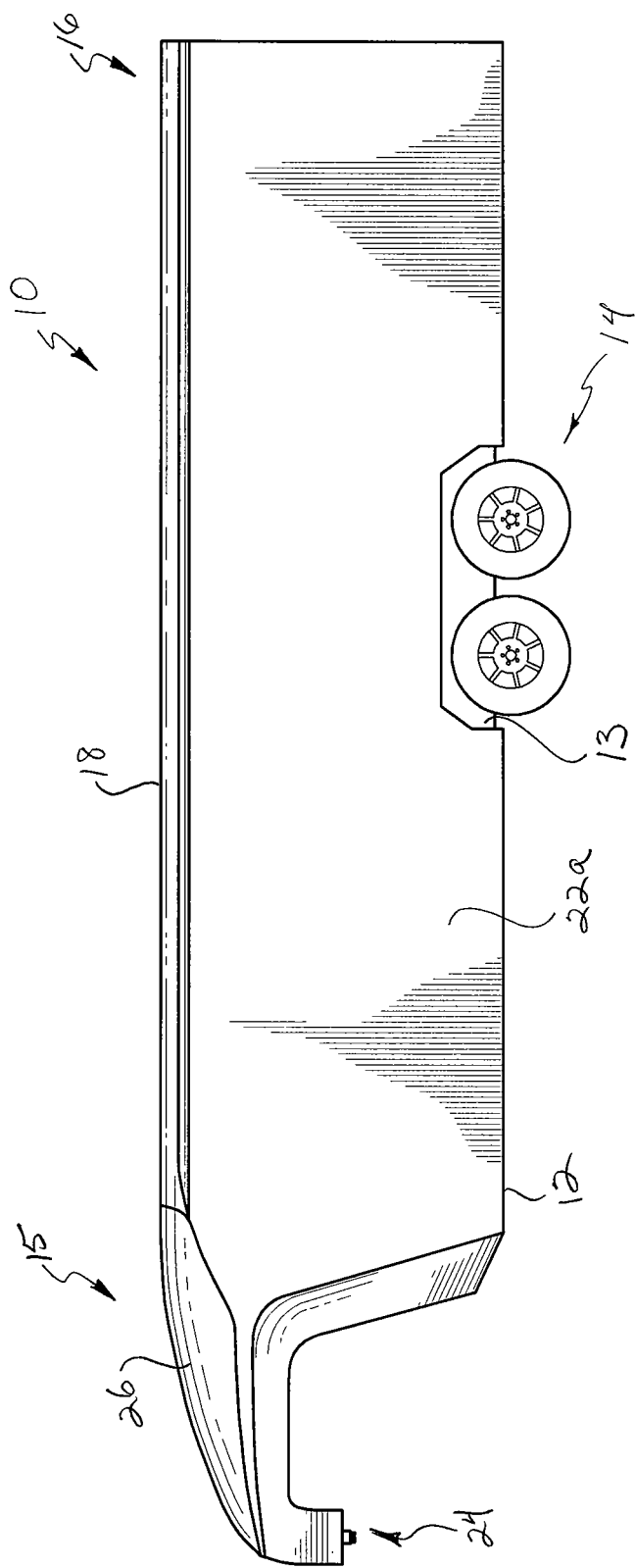
FIG. 1 is a side elevational view of the aerodynamic gooseneck trailer of the present invention.
Figure 2:
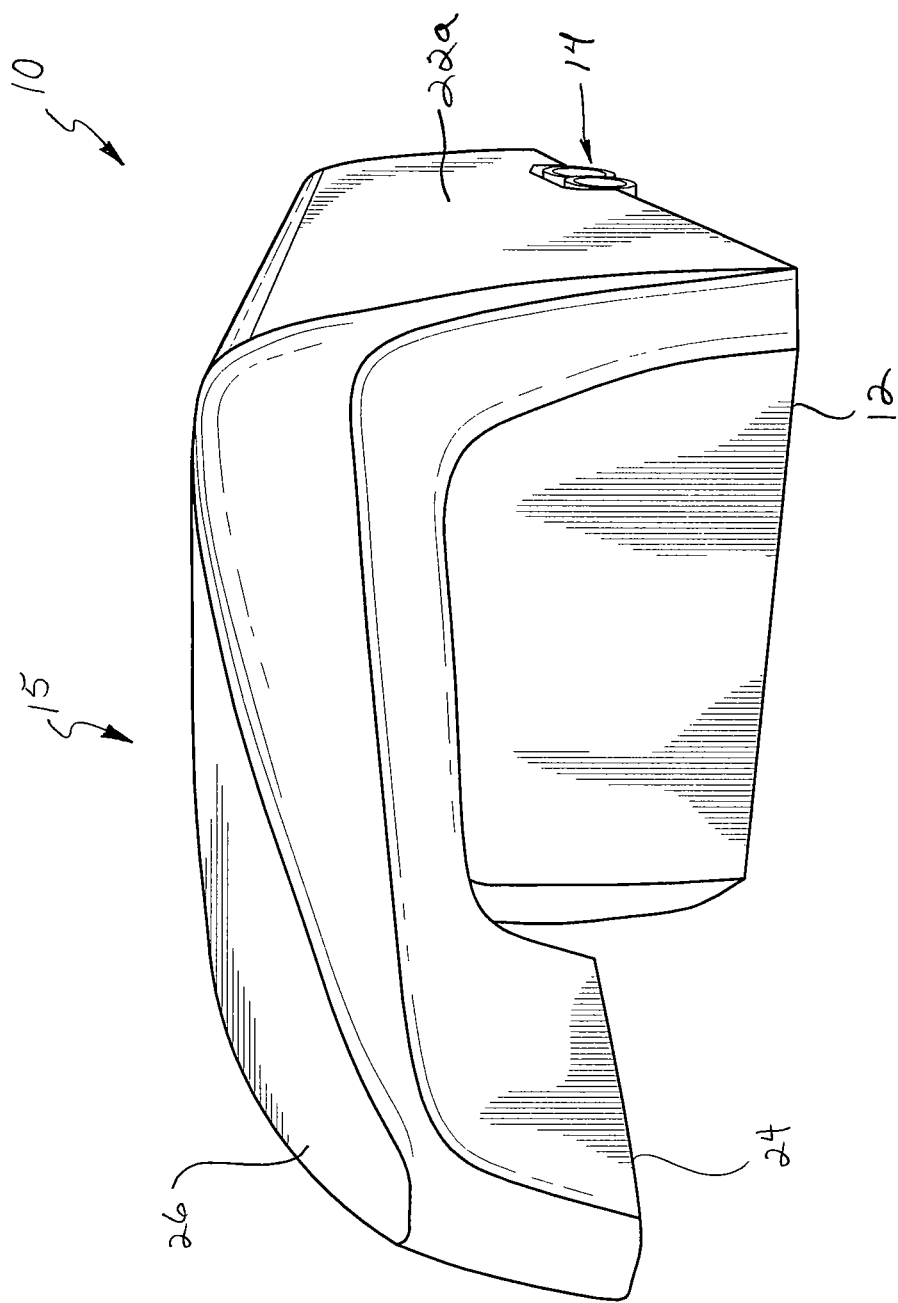
FIG. 2 is a front perspective view of the leading end of the aerodynamic gooseneck trailer of FIG. 1.

As is illustrated in the drawings, which are provided by way of example, and not by way of limitation, the goose neck trailer of the invention is specifically designed to be extremely aerodynamic, and includes a specially designed anterior body shape, starting at the front tip of the vehicle, that is primarily made from convex contours, and splines or continuous curves. These surfaces are meshed together to produce a very sleek, and aerodynamically efficient shape that is also a recognizable and identifiable form.

Proceeding rearwards, following the sides the length of the body, this section of the trailer is generally "straight" from front to the back, however the vertical walls are curved from top to the bottom, with the top corners of the walls being narrower than the bottom corner. The roof section could be either flat or curved.

The rear surface may be flat (in a single plane) or have an aerodynamic shape (rounded, convex, teardrop, or "spoiler/flap") to help reduce energy lost to aerodynamic drag.

Accordingly, the present invention provides for an aerodynamic gooseneck trailer 10 having a trailer body 12 having a chassis 13 supported by a plurality of wheels 14, a leading end 15, a trailing end 16, a roof section 18 typically formed by a plurality of roof ribs 19, a floor section 20, and substantially vertically oriented sidewalls 22a, 22b typically formed by a plurality of sidewall ribs 23a, 23b, connected between the roof section and floor section. The leading end includes a front connector 24 configured to be connected to a towing vehicle (not shown).

Figure 6:
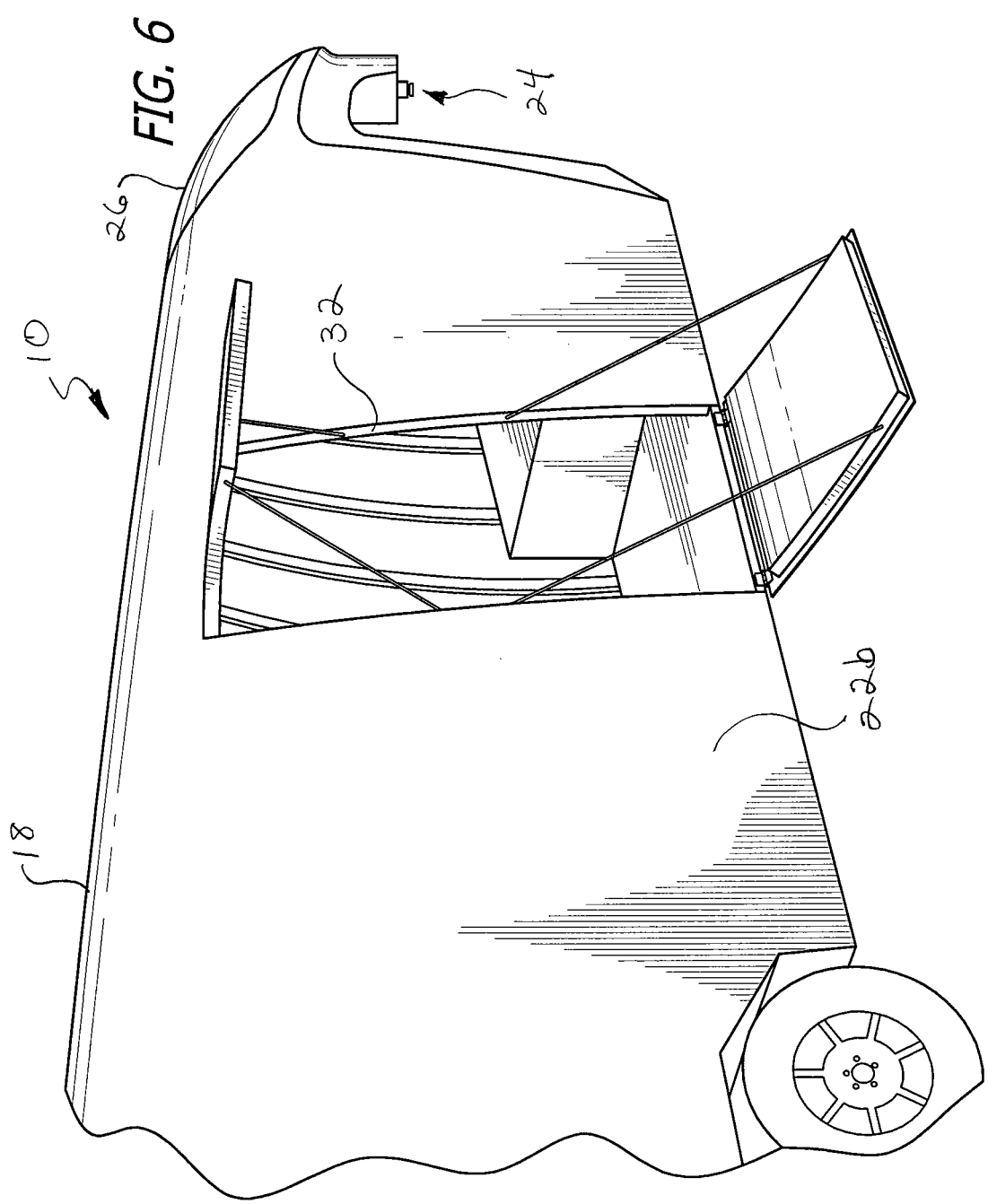
FIG. 6 is an enlarged perspective view of a front portion of the aerodynamic gooseneck trailer of FIG. 1.

The trailer body advantageously includes a tapered anterior body portion 26 that tapers forwardly to the narrow leading end, connecting the leading end to the roof section, the floor section, and the substantially vertically oriented sidewalls, the tapered anterior body portion extends rearwardly and flares outwardly from the front connector to connect with the roof section, the floor section, and the substantially vertically oriented sidewalls. The tapered anterior body portion is formed to have substantially convex contours and splines or continuous curves. The substantially vertically oriented sidewalls curve outwardly from the roof section to the floor section. In a presently preferred aspect, the roof section and the vertically oriented sidewalls form top corners spaced apart a first distance 28, and the floor section and the vertically oriented sidewalls form bottom corners spaced apart a second distance 30. The first distance is preferably smaller than the second distance, such that the roof section is narrower than the floor section. As is illustrated in FIG. 6, one or more of the sidewalls may include one or more openings 32 for a door and/or window.

Figure 3:
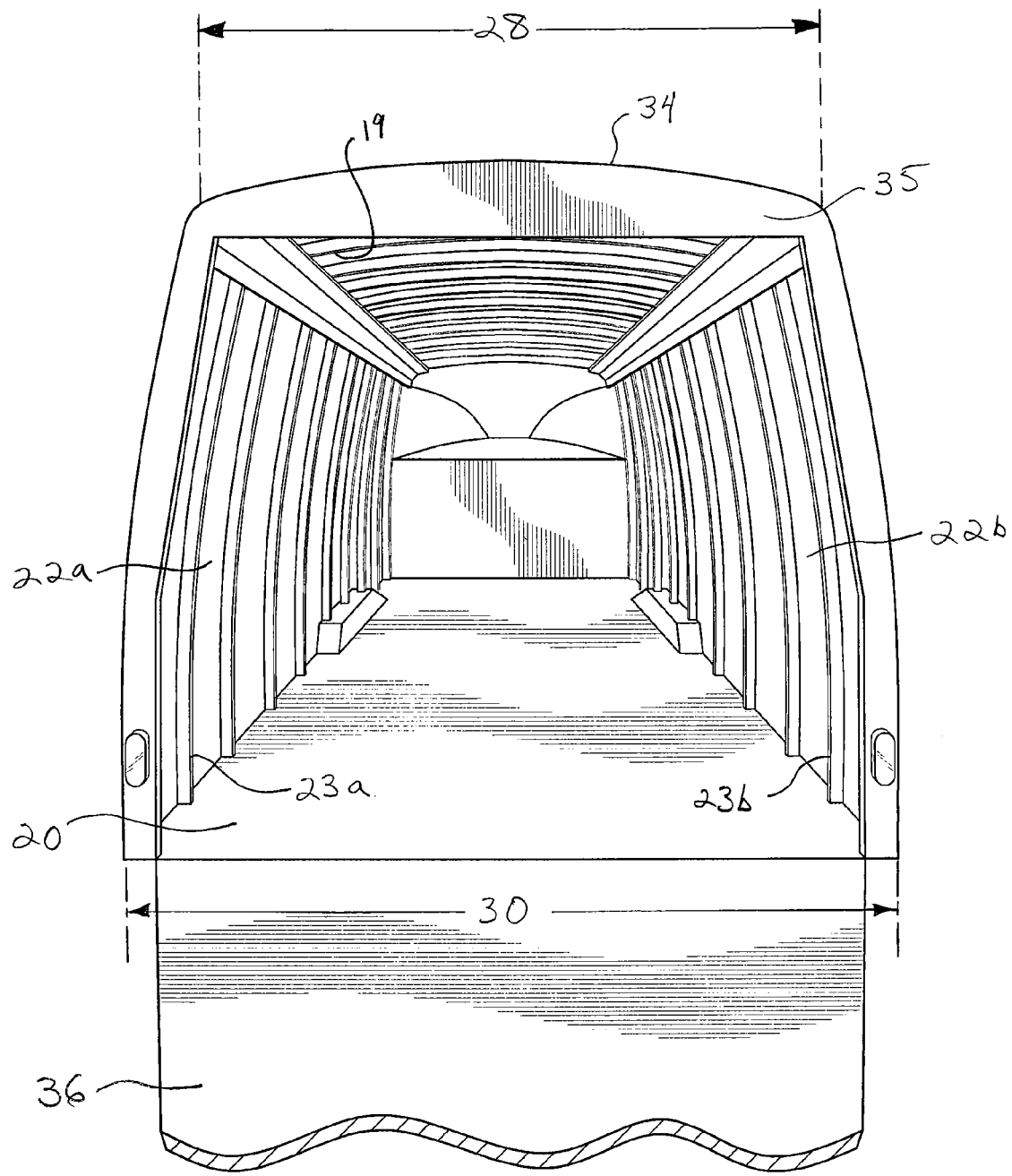
FIG. 3 is a rear interior view of the aerodynamic gooseneck trailer of FIG. 1.
Figure 4:
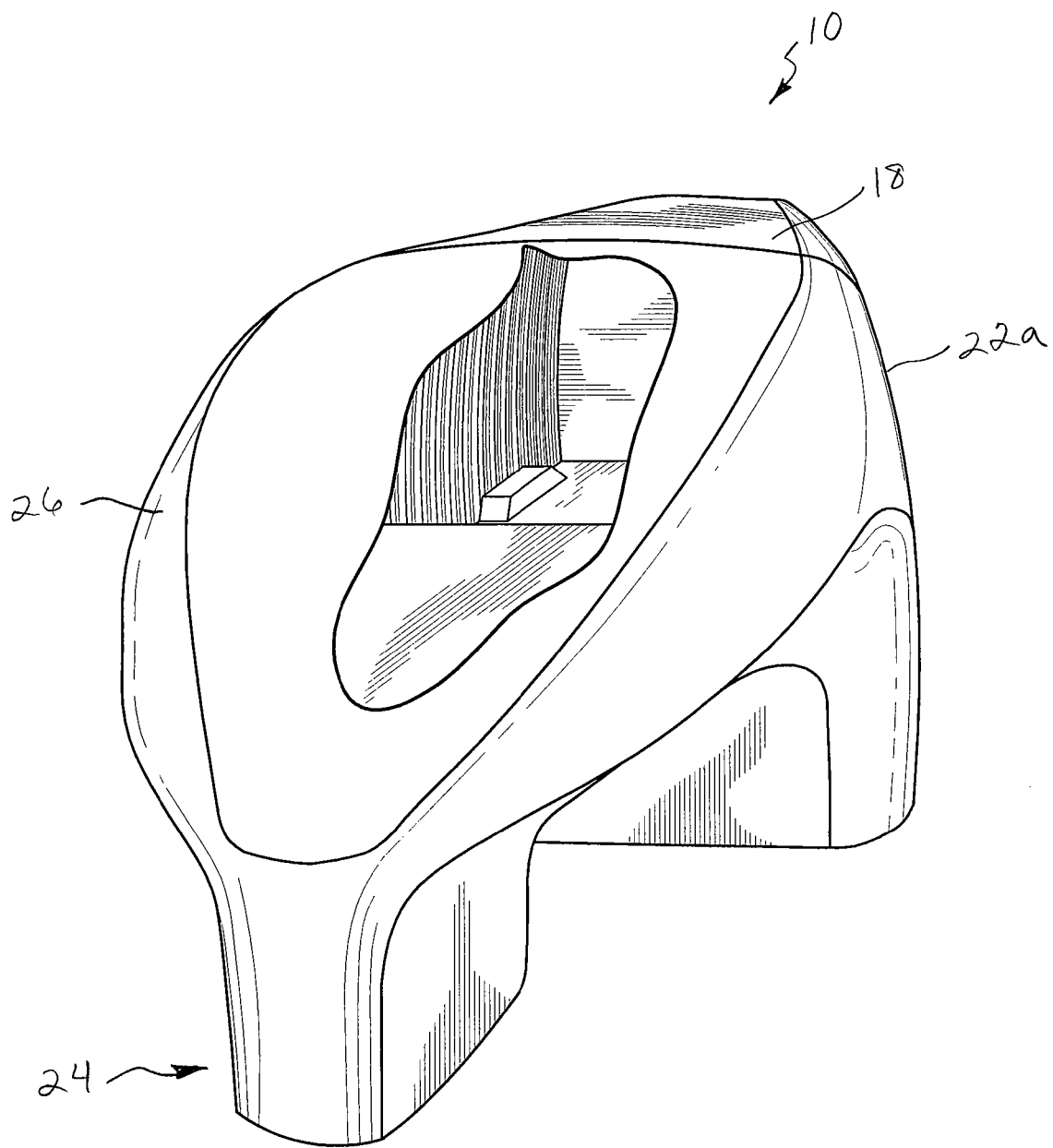
FIG. 4 is a cutaway top front perspective view of the aerodynamic gooseneck trailer of FIG. 1.
Figure 5:
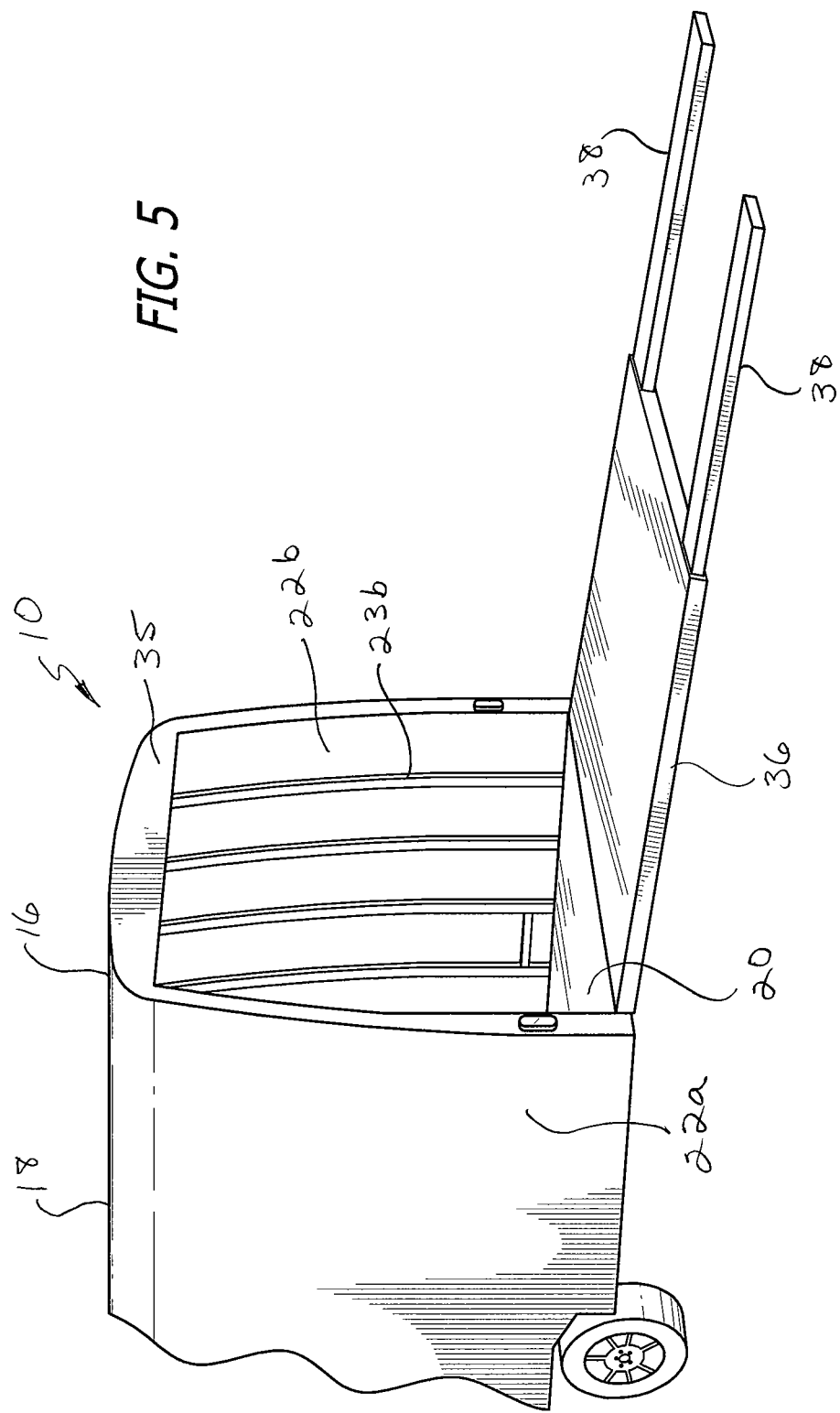
FIG. 5 is a side rear perspective view of the aerodynamic gooseneck trailer of FIG. 1.

The roof section may have a flat surface, or a curved surface 34 as shown in FIG. 3. The rear surface 35 may also be flat; however, in order to reduce aerodynamic drag, the rear surface may be rounded, convex, or teardrop shaped, and may include a spoiler. The aerodynamic gooseneck trailer may also include a rear door 36 hingedly connected to the trailer body that is configured to be folded down to serve as a rear ramp, and may further include a pair of extended ramp sections 38 that can be hingedly connected to an upper end portion of the rear door to be folded down for use, or that can telescope to extend outwardly for use, to support the wheels of a vehicle to allow the vehicle to enter and exit the aerodynamic gooseneck trailer of the invention.

It will be apparent from the foregoing that while particular forms of the invention have been illustrated and described, various modifications can be made without departing from the spirit and scope of the invention.

I claim:

1. An aerodynamic gooseneck trailer, comprising:
   a trailer body having a leading end, a trailing end, a roof section and a floor section, and substantially vertically oriented sidewalls connected between the roof section and floor section, said roof section including a plurality of inner roof ribs connected between said substantially vertically oriented sidewalls, and said sidewalls including a plurality of inner sidewall ribs connected between said roof section and said floor section, the leading end including a front connector, said trailer body including a tapered anterior body portion connecting said leading end to said roof section, said floor section, and said substantially vertically oriented sidewalls, said tapered anterior body portion extending rearwardly and flaring outwardly from said front connector to said roof section, said floor section and said substantially vertically oriented sidewalls, said trailing end including a rear surface, wherein said roof section and said vertically oriented sidewalls form top corners spaced apart a first distance, and said floor section and said vertically oriented sidewalls form bottom corners spaced apart a second distance, said first distance being smaller than said second distance, such that said roof section is narrower than said floor section.

2. The aerodynamic gooseneck trailer of claim 1, wherein said tapered anterior body portion is formed to have substantially convex contours and continuous curves.

3. The aerodynamic gooseneck trailer of claim 1, wherein said substantially vertically oriented sidewalls curve outwardly from said roof section to said floor section.

4. The aerodynamic gooseneck trailer of claim 1, wherein said roof section is flat.

5. The aerodynamic gooseneck trailer of claim 1, wherein said roof section is curved.

6. The aerodynamic gooseneck trailer of claim 1, wherein said rear surface is flat.

7. The aerodynamic gooseneck trailer of claim 1, wherein said rear surface is rounded.

8. The aerodynamic gooseneck trailer of claim 1, wherein said rear surface is convex.

9. The aerodynamic gooseneck trailer of claim 1, further comprising a rear door hingedly connected to the trailer body that is configured to be folded down to serve as a rear ramp.

10. The aerodynamic gooseneck trailer of claim 9, further comprising a pair of extended ramp sections hingedly connected to said rear door and configured to be folded down.

11. In an aerodynamic gooseneck trailer, an improvement in the aerodynamic gooseneck trailer comprising:
    a trailer body having a leading end, a trailing end, a roof section and a floor section, and substantially vertically oriented sidewalls connected between the roof section and floor section, said roof section including a plurality of inner roof ribs connected between said substantially vertically oriented sidewalls, and said sidewalls including a plurality of inner sidewall ribs connected between said roof section and said floor section, the leading end including a front connector, said trailer body including a tapered anterior body portion connecting said leading end to said roof section, said floor section, and said substantially vertically oriented sidewalls, said tapered anterior body portion extending rearwardly and flaring outwardly from said front connector to said roof section, said floor section and said substantially vertically oriented sidewalls, said trailing end including a rear surface, wherein said roof section and said vertically oriented sidewalls form top corners spaced apart a first distance, and said floor section and said vertically oriented sidewalls form bottom corners spaced apart a second distance, said first distance being smaller than said second distance, such that said roof section is narrower than said floor section.

12. The aerodynamic gooseneck trailer of claim 11, wherein said tapered anterior body portion is formed to have substantially convex contours and continuous curves.

13. The aerodynamic gooseneck trailer of claim 11, wherein said substantially vertically oriented sidewalls curve outwardly from said roof section to said floor section.

14. The aerodynamic gooseneck trailer of claim 11, wherein said roof section is curved.

15. The aerodynamic gooseneck trailer of claim 11, wherein said rear surface is rounded.

16. The aerodynamic gooseneck trailer of claim 11, further comprising a rear door hingedly connected to the trailer body that is configured to be folded down to serve as a rear ramp.

17. The aerodynamic gooseneck trailer of claim 16, further comprising a pair of extended ramp sections hingedly connected to said rear door and configured to be folded down.

\* \* \* \* \*